(12) United States Patent
Menguy (10) Patent No.: US 12,019,281 B2
(45) Date of Patent: Jun. 25, 2024

(54) SEALED OPTICAL CABLE ASSEMBLIES AND METHODS OF FABRICATING THE SAME

(71) Applicant: Corning Pouyet SAS, Pontchâteau (FR)

(72) Inventor: Michel Teva Menguy, La Chevallerais (FR)

(73) Assignee: CORNING POUYET SAS, Pontchateau (FR)

( * ) Notice: Subject to any disclaimer, the term of this patent is extended or adjusted under 35 U.S.C. 154(b) by 468 days.

(21) Appl. No.: 17/219,008

(22) Filed: Mar. 31, 2021

(65) Prior Publication Data

US 2021/0271029 A1 Sep. 2, 2021

Related U.S. Application Data

(63) Continuation of application No. PCT/EP2018/081258, filed on Nov. 14, 2018.

(30) Foreign Application Priority Data

Oct. 3, 2018 (EP) .................... 18306303

(51) Int. Cl.
  *G02B 6/36* (2006.01)
  *G02B 6/38* (2006.01)
  *G02B 6/44* (2006.01)

(52) U.S. Cl.
  CPC .......... *G02B 6/387* (2013.01); *G02B 6/3825* (2013.01); *G02B 6/38875* (2021.05);
  (Continued)

(58) Field of Classification Search
  CPC .. G02B 6/387; G02B 6/3825; G02B 6/38875; G02B 6/3888; G02B 6/3897; G02B 6/4444; G02B 6/36
  See application file for complete search history.

(56) References Cited

U.S. PATENT DOCUMENTS 8,038,356 B2 * 10/2011 Marcouiller ......... G02B 6/3888
  385/86
9,684,138 B2    6/2017 Lu
  (Continued)

FOREIGN PATENT DOCUMENTS

WO    2013/106183 A1    7/2013
WO    2013/177014 A1    11/2013
  (Continued)

OTHER PUBLICATIONS

International Search Report and Written Opinion of the International Searching Authority; PCT/EP2018/081258; dated Jul. 1, 2019; 11 Pages; European Patent Office.

*Primary Examiner* — Jennifer Doan
(74) *Attorney, Agent, or Firm* — Michael E. Carroll, Jr.

(57) ABSTRACT

Sealed optical cable assemblies are disclosed. In one embodiment, an optical connector includes an optical cable having an end, a connector body coupled to the end of the optical cable, and a sealing grommet disposed over the optical cable. The optical connector further includes a connector housing having a first housing end portion, a second housing end portion, an internal cavity. The internal cavity has an interior surface proximate the second housing end portion. The connector body is disposed within the internal cavity of the connector housing. The sealing grommet is positioned within the internal cavity such that an outer surface of the sealing grommet is in contact with the interior surface of the second housing end portion. The connector body and the optical cable are movable relative to the connector housing in an axial direction of the optical connector, and the sealing grommet is deformable to accommodate movement of the connector body and the optical cable relative to the connector housing.

19 Claims, 9 Drawing Sheets

(52) U.S. Cl.
CPC ......... *G02B 6/3888* (2021.05); *G02B 6/3897* (2013.01); *G02B 6/4444* (2013.01)

(56) References Cited

U.S. PATENT DOCUMENTS

| | | | |
|---|---|---|---|
| 9,817,195 | B2 | 11/2017 | Menguy et al. |
| 9,977,198 | B2 * | 5/2018 | Bund .................. G02B 6/3879 |
| 2011/0280521 | A1 | 11/2011 | Kachmar |
| 2017/0102507 | A1 | 4/2017 | Menguy et al. |
| 2018/0031774 | A1 | 2/2018 | Van et al. |
| 2019/0384015 | A1 * | 12/2019 | Carapella ............. G02B 6/3897 |

FOREIGN PATENT DOCUMENTS

| | | |
|---|---|---|
| WO | 2015/050605 A1 | 4/2015 |
| WO | 2016/101218 A1 | 6/2016 |
| WO | 2017/106514 A1 | 6/2017 |

\* cited by examiner

SEALED OPTICAL CABLE ASSEMBLIES AND METHODS OF FABRICATING THE SAME

CROSS-REFERENCE TO RELATED APPLICATIONS

This application is a continuation of International Patent Application Serial No. PCT/EP2018/081258 filed on Nov. 14, 2018 which claims the benefit of priority under European Patent Application Serial No. 18306303.1 filed on Oct. 3, 2018, the content of which is relied upon and incorporated herein by reference in its entirety.

BACKGROUND

The present disclosure generally relates to optical cable assemblies and, more particularly, to optical cable assemblies with ruggedized optical connectors having improved sealing for ingress protection.

Benefits of optical fiber include extremely wide bandwidth and low noise operation. Because of these advantages, optical fiber is increasingly being used for a variety of applications, including, but not limited to, broadband voice, video, and data transmission. Outdoor fiber networks are popular to support the demand of data consumption.

To deliver fiber-to-the-home (FTTH), drop cables are used to provide drop services to a group of customers. Optical connectors are attached to the ends of these drop cables to make connections to fiber terminals at the individual homes. Because some fiber terminals are located outdoors, it is not uncommon for the optical connectors of drop cables to be designed for outdoor environments. Such optical connectors are commonly referred to as ruggedized or hardened optical connectors, and should including sealing between an external connector housing of the optical connector and the drop cable.

SUMMARY

In one embodiment, an optical cable assembly includes an optical cable having an end, a connector body coupled to the end of the optical cable, and a sealing grommet disposed over the optical cable such that an internal sealing surface of the sealing grommet is in contact with an outer surface of the optical cable. The optical cable assembly further includes a connector housing having a first housing end portion, a second housing end portion, and an internal cavity. The internal cavity is at least partially defined by an interior surface of the second housing end portion. The connector body is at least partially disposed within the internal cavity of the connector housing. The sealing grommet is positioned within the internal cavity such that an outer surface of the sealing grommet is in contact with the interior surface of the second housing end portion. The connector body and the optical cable are movable relative to the connector housing in an axial direction of the optical connector. The sealing grommet is deformable to accommodate movement of the connector body and the optical cable relative to the connector housing.

In another embodiment, an optical connector includes an optical cable having an end, and a connector body coupled to the end of the optical cable, wherein the connector body is field mountable. The optical connector further includes a connector housing having a first housing end portion, a second housing end portion, and an internal cavity. The connector body is at least partially disposed within the internal cavity of the connector housing. The second housing end portion includes a threaded surface. The optical connector further includes a housing extension having a first extension end, a second extension end, and an extension cavity. The extension cavity is at least partially defined by an interior surface of the second extension end. The first extension end comprises an internal threaded surface within the extension cavity. The second extension end has an outer threaded surface. The optical cable assembly further includes a sealing grommet disposed over the optical cable such that an internal sealing surface of the sealing grommet is in contact with an outer surface of the optical cable. The threaded surface of the second housing end portion is mated with the internal threaded surface at the first extension end of the housing extension. The sealing grommet is positioned within the extension cavity such that an outer surface of the sealing grommet is in contact with the interior surface of the extension cavity. The connector body and the optical cable are movable relative to the connector housing and the housing extension in an axial direction of the optical cable assembly. The sealing grommet is deformable to accommodate movement of the connector body and the optical cable relative to the connector housing and the housing extension.

In yet another embodiment, a method of assembling an optical cable assembly includes translating a sealing grommet over a connector body coupled to an end of an optical cable such that an internal sealing surface of the sealing grommet is in contact with an outer surface of the optical cable, and positioning a connector housing over the connector body. The connector housing includes a first housing end portion, a second housing end portion, and an internal cavity. The internal cavity has an interior surface proximate the second housing end portion. The connector body is at least partially disposed within the internal cavity of the connector housing. The method further includes positioning the sealing grommet within the internal cavity such that an outer surface of the sealing grommet is in contact with the interior surface of the second housing end portion. The connector body and the optical cable are movable relative to the connector housing in an axial direction of the optical connector and the sealing grommet is deformable to accommodate movement of the connector body and the optical cable relative to the connector housing.

DETAILED DESCRIPTION

Embodiments described herein are directed to optical cable assemblies having ruggedized, hardened optical connectors with sealing according to Ingress Protection rating 68 (IP68) of the International Electrotechnical Commission (IEC) standard 60529 (2.2 Edition, August 2013) ("the IP68 standard"), which is incorporated herein by reference. Particularly, a sealing grommet is used to seal either factory preconnectorized drop cables, or drop cables that are connectorized in the field (i.e., field mountable connectorized optical cables). The sealing grommets described herein may also be used to convert a standard connectorized drop cable into a sealed connectorized drop cable in the field.

The sealing grommets described herein provide IP68 rated sealing that is achievable by any installer in the field in only a few seconds when assembling a field mount hardened (i.e. ruggedized) optical connector. Current field mount hardened connectors have only an IP65 rated sealing. The single sealing grommets described herein reduce costs to provide a sealed hardened optical connector by reducing the number of components required for sealing, as well reducing the need for complex tools used to install previous sealing members.

The sealing grommets described herein also allow an internal connector body and the optical cable to move within an external connector housing. When connecting optical fibers, the engagement forces between the optical fibers and/or between ferrules which hold the optical fibers should be controlled. Thus, optical fiber connectors may include a resilient member or spring to control the axial connection forces.

In the ruggedized optical connectors described herein, the internal connector body is movably coupled to the connector housing such that the optical cable to which the internal connector body is mounted can move axially relative to the connector housing. The sealing grommets described herein allow the drop cable (including the optical cable and the connector body) to axially move relative to the connector housing. The low hardness of the sealing grommet allows it to deform to enable drop cable movement. Further, the material of the sealing grommet provides a coefficient of friction between the sealing grommet and the optical cable and the connector housing such that the sealing grommet does not slip (or minimally slips) when the drop cable is moved. This provides a high level of water tightness according to IP68.

Various embodiments of optical connector assemblies and methods of their fabrication are described in detail herein.

Figure 1:
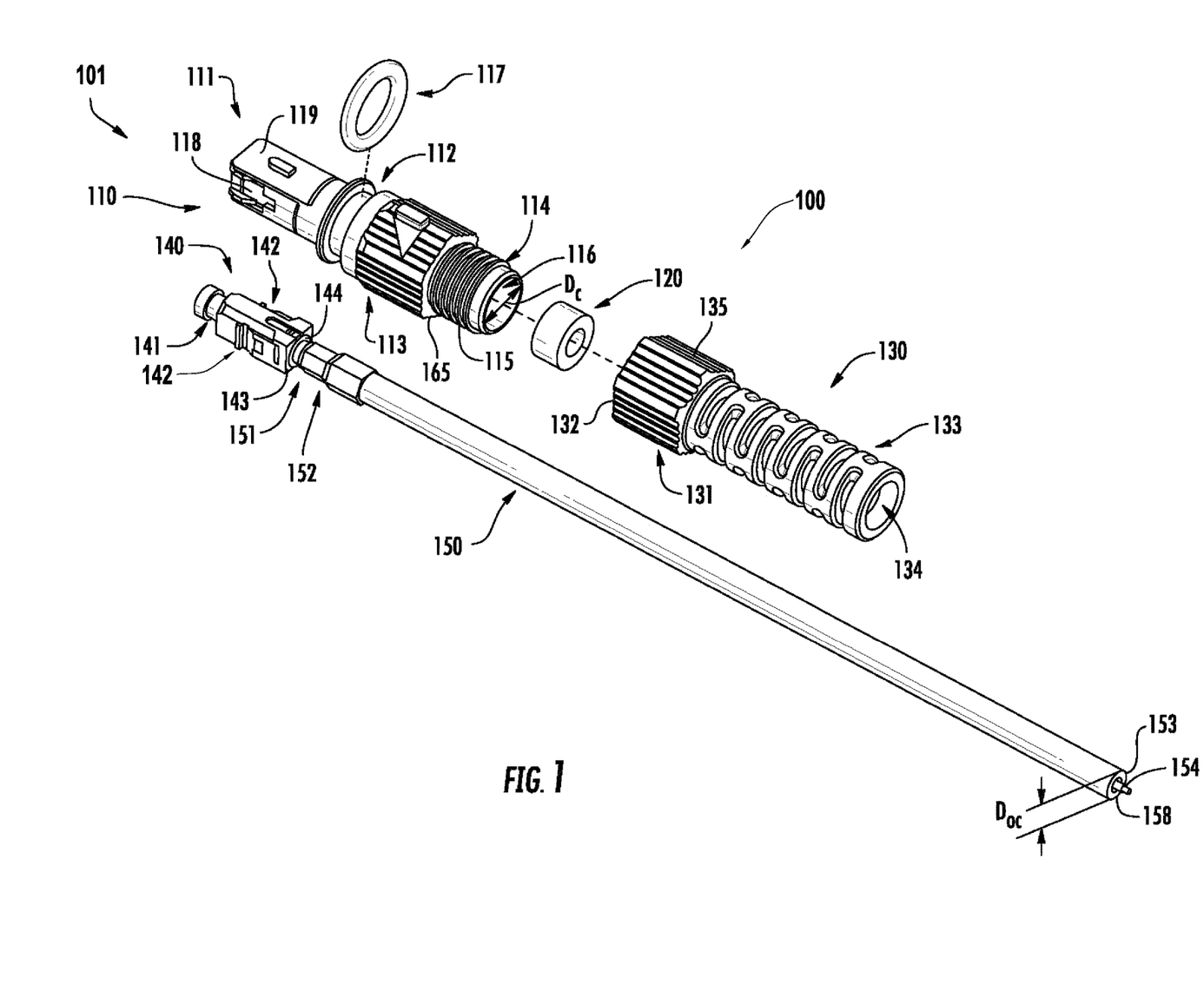
FIG. 1 is a partially exploded perspective view of an example ruggedized optical connector of this disclosure.
Figure 2:
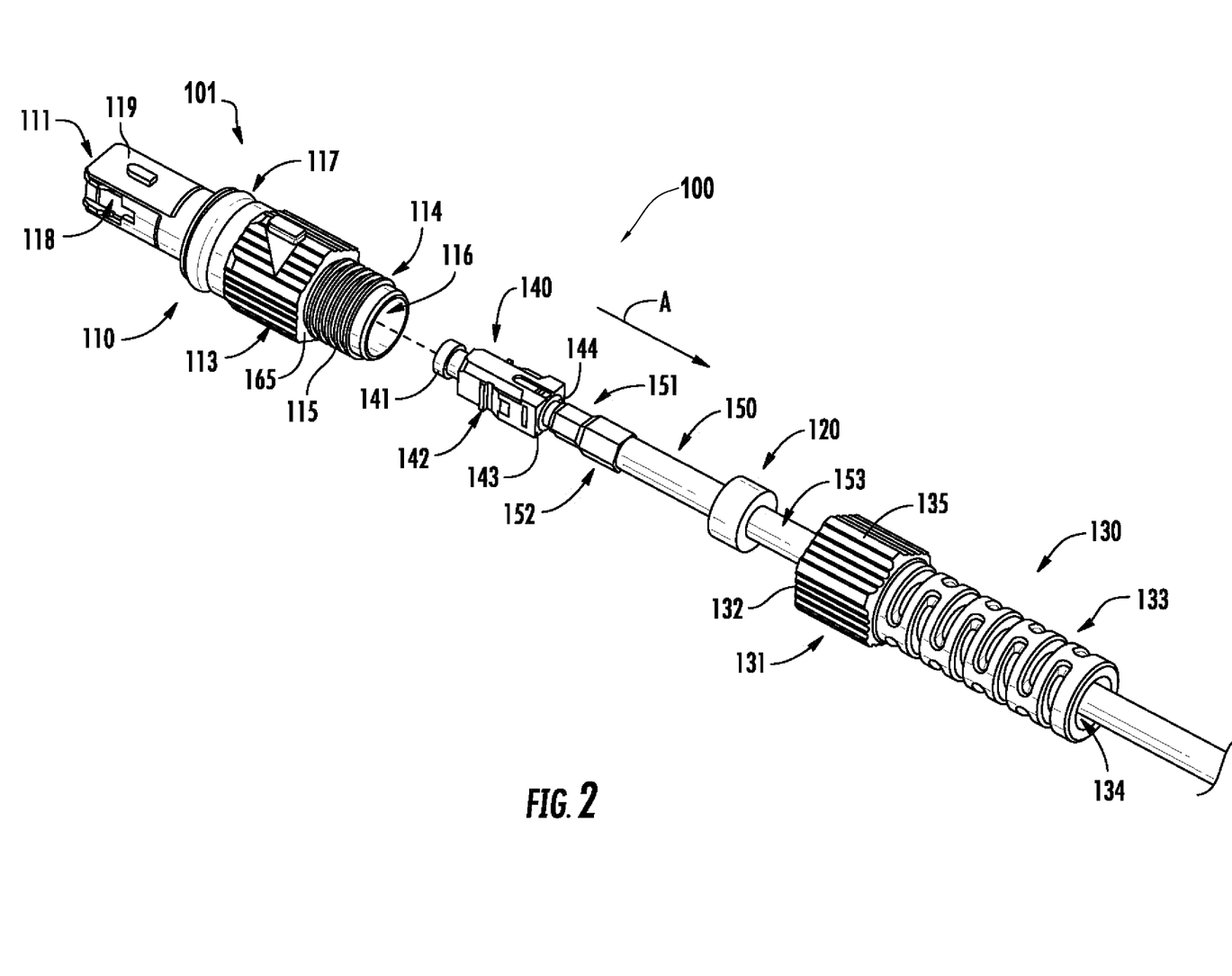
FIG. 2 is a different partially exploded perspective view of the example ruggedized optical connector depicted in FIG. 1.
Figure 3:
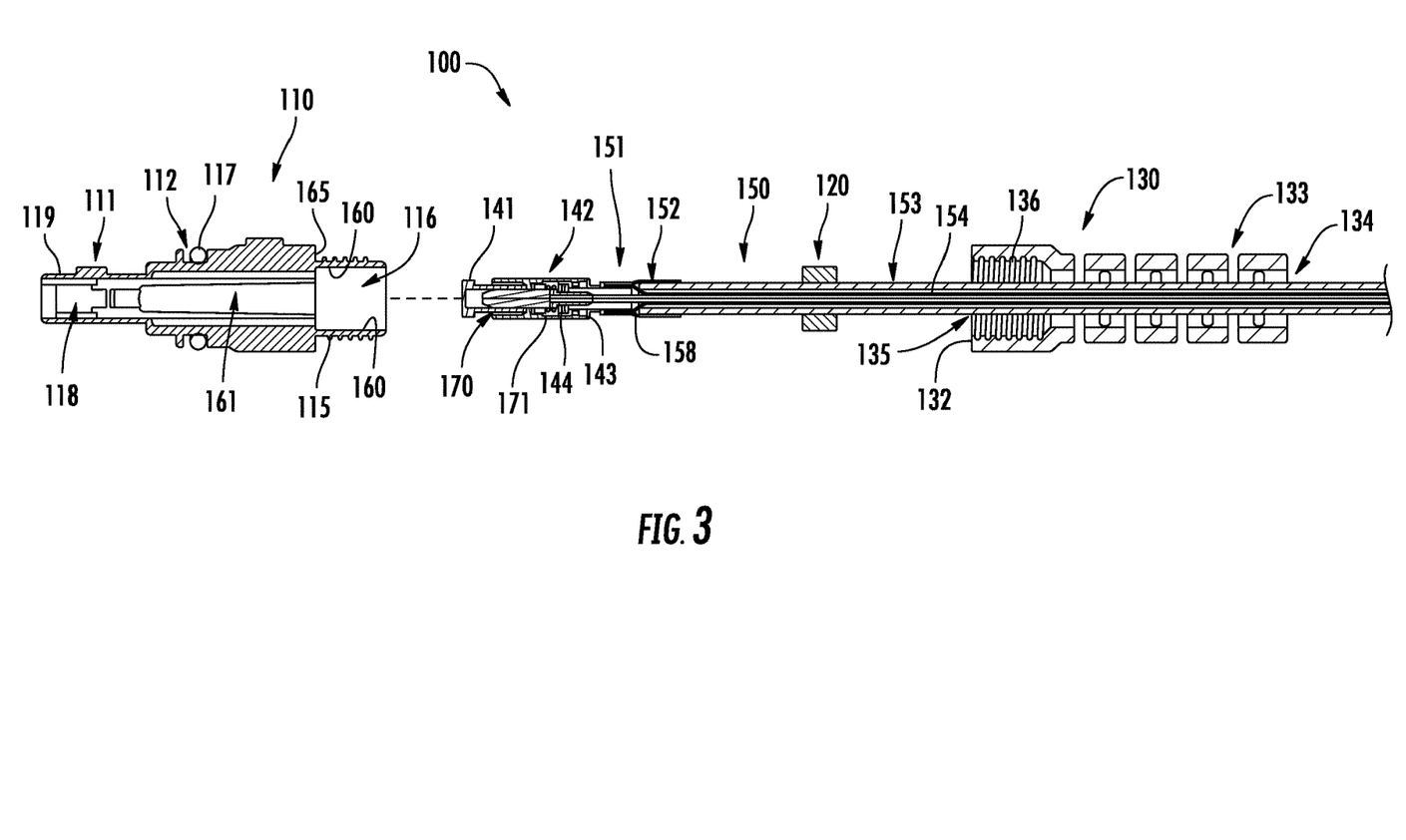
FIG. 3 is a partially exploded cross-sectional view of the example ruggedized optical connector depicted in FIGS. 1 and 2.

Referring now to FIGS. 1-3, an example optical cable assembly 100 including a ruggedized optical connector 101 (also referred to as hardened optical connector or simply optical connector) is schematically illustrated. FIG. 1 is a perspective view of a partially assembled optical cable assembly 100, while FIG. 2 is another perspective view of a process for installing a sealing grommet and ruggedized connector housing 110 (also referred to as outer connector housing or simply connector housing). FIG. 3 is a cross-sectional view of the partially assembled optical connector depicted in FIG. 2.

The example optical cable assembly 100 comprises an optical cable 150 having an end 151. The optical cable 150 may be any type of optical cable suitable for outdoor applications. In the illustrated embodiment, the optical cable 150 includes an outer jacket 153 that surrounds at least one optical fiber 154. One or more strength members 158 are also disposed within the outer jacket 153. Embodiments are not limited by the materials of the outer jacket 153, the one or more strength members 158 and the at least one optical fiber 154. As non-limiting examples, the outer jacket 153 may be fabricated from a polymer material, and the one or more strength members 158 may be metal, Kevlar®, aramid, and/or glass fiber strands. Other materials are also possible. The at least one optical fiber 154 may be a single-mode or multi-mode optical fiber suitable for the end application.

Figure 9:
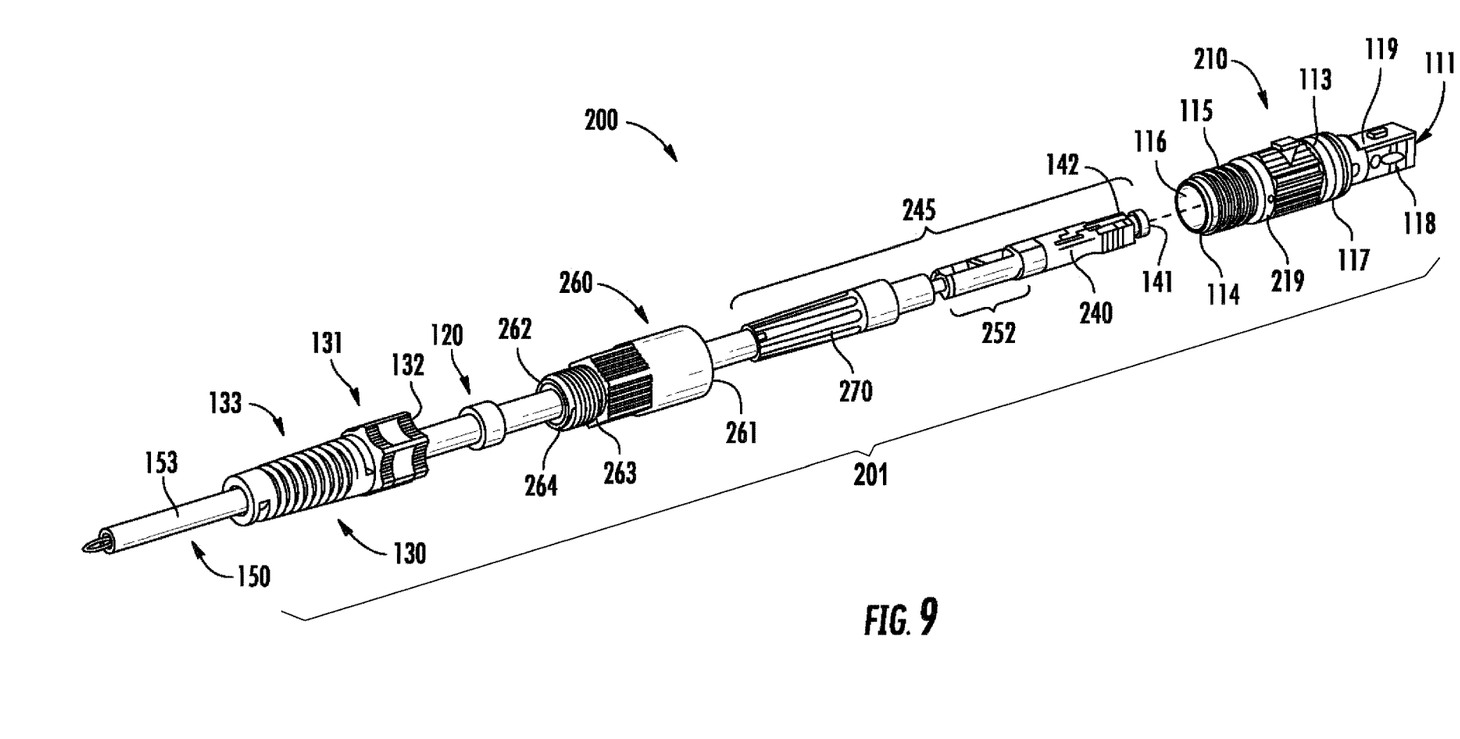
FIG. 9 is a partially exploded perspective view of a field mountable ruggedized optical connector according to one or more embodiments of this disclosure.

The example optical cable assembly 100 further includes an optical connector 101 coupled to an end of the optical cable 150. A connector body 140 of the optical connector 101 (also referred to as a connector backbone or connector inner housing) is rigidly mounted to the end 151 of the optical cable 150. In the illustrated embodiment, the connector body 140 is mounted to the end 151 of the optical cable 150 at a factory. Mounting may alternatively be done in the field. Indeed, an example optical cable assembly 200 having a ruggedized field-mountable optical connector 201 is depicted in FIG. 9 and described in detail further below.

The connector body 140 may have any shape suitable for the end application. In the illustrated embodiment, the connector body is depicted as part of an SC type connector. However, embodiments are not limited thereto. For example, the connector body 140 may be configured as part of MPO, ST, FC, MU and LC type connectors. As shown in FIGS. 1 and 2, the connector body 140 has engagement features 142 operable to cooperate with corresponding engagement features of a connector housing 110 as described below. The connector body 140 further includes a cavity 144 that opens at a rear end 143 and is operable to receive the optical fiber 154.

A crimp member 152 is used to rigidly mount the connector body 140 to the end 151 of the optical cable 150. As shown in FIG. 3, a portion of the outer jacket 153 is removed to expose the one or more strength members 158. The crimp member 152 is then crimped to clamp the one or more strength members 158 between the crimp member 152 and the connector body 140. In this manner, the connector body 140 may be rigidly mounted to the optical cable 150. It should be understood that embodiments are not limited to the crimp member 152, and that other means for rigidly mounting the connector body 140 to the optical cable 150 may be utilized.

Referring to FIG. 3, a ferrule 170 is maintained within the connector body 140. In the illustrated embodiment, the ferrule 170 is biased by a bias member 171 within the connector body 140 such that the ferrule 170 may axially translate (e.g., retract) when mated to another ferrule. The ferrule 170 may be configured as any type of ferrule suitable for the connector type. The ferrule 170 may be made of a ceramic, glass, plastic, or metal material. The ferrule 170 includes one or more bores that receive the one or more optical fibers 154 of the optical cable 150. The one or more optical fibers 154 terminate at an end face of the ferrule 170. The ends of the optical fibers 154 may or may not be polished depending on the end application. In some embodiments, a dust cap 141 is placed over the ferrule 170 to protect it from damage when the optical cable assembly 100 is not in use.

Referring collectively to FIGS. 1-3, the example optical connector 101 further comprises the connector housing 110 referred to above and a bend control member 130 coupled to the connector housing 110. The connector body 140 is disposed within an internal cavity 116 of the connector housing 110 when the connector housing 110 is coupled to the bend control member 130.

The connector housing 110 has a first housing end portion 111 defined by a shell portion 119 (e.g., an SC-type shell portion or other connector type shell portion depending on the end application) and a second housing end portion 114. The shell portion 119 includes engagement features 118 configured to cooperate with engagement features 142 of the connector body 140 when the connector housing 110 is disposed over the connector body 140. A middle portion 113 is disposed between the first housing end portion 111 and the second housing end portion 114, and may have a shape and/or texture to enable gripping the connector housing 110 by use of tool or by hand to mate the connector housing 110 to the bend control member 130. In the illustrated example, the middle portion 113 further includes an external groove 112 that seats a sealing element 117 (e.g., an o-ring) that seals the connector housing 110 when installed in a port of another structure (not shown). The second housing end portion 114 of the connector housing 110 has an exterior threaded surface 115 configured to mate with an interior threaded surface (not shown) within a bend control member cavity 134 of the bend control member 130.

The example bend control member 130 includes a main portion 131, a flexible bend control portion 133, and the bend control member cavity 134. The main portion 131 may have a shape and/or texture similar to the middle portion 113 of the connector housing 110 so that it may be easily grasped by a tool or by hand to mate the bend control member 130 to the connector housing 110 or otherwise handle or manipulate the ruggedized optical connector 101. The flexible bend control portion 133 may comprise any shape and suitably pliable material that prevents the optical cable 150 from exceeding a minimum bend radius that may affect optical communication of the optical cable 150. Embodiments are not limited by the shape of the bend control member 130.

Referring now to FIGS. 2 and 3, the optical cable 150 is positioned through bend control member cavity 134 of the bend control member 130. The connector body 140 is then rigidly mounted onto the end 151 of the optical cable 150 (e.g., by use of the crimp member 152 as described above).

Embodiments of the present disclosure further comprise a sealing grommet 120 that provides water sealing capabilities that satisfy at least the IP68 standard. Thus, the sealing grommet 120 provides IP68 rated sealing for the ruggedized optical connector 101 by preventing water from entering the connector housing 110 if water migrates through the interface between connector housing 110 and the bend control member 130.

Figure 4A:
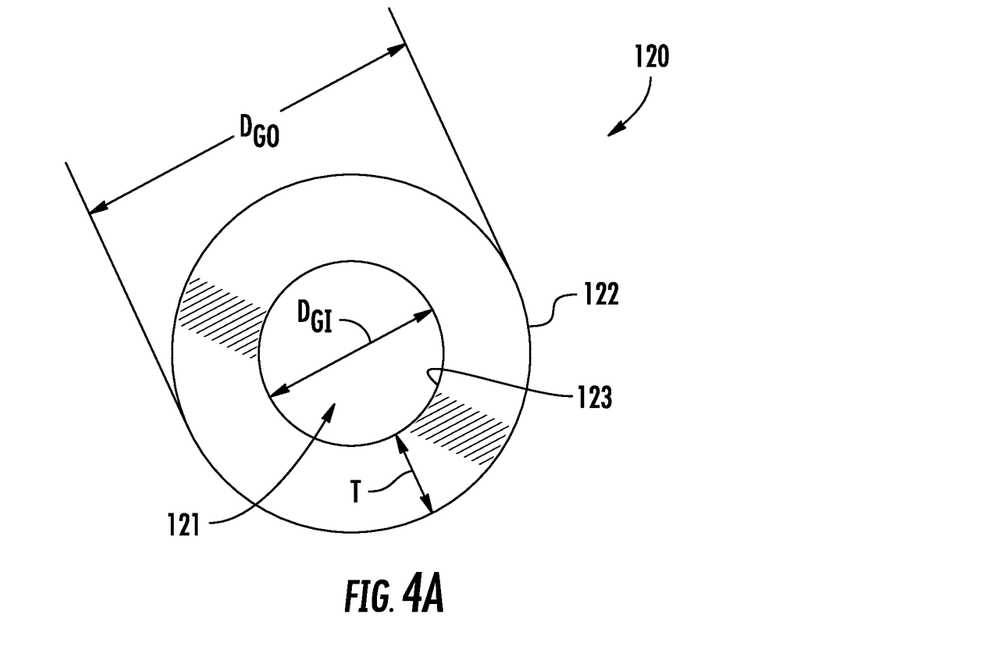
FIG. 4A is a front elevation view of an example sealing grommet according to one or more embodiments of this disclosure.
Figure 4B:
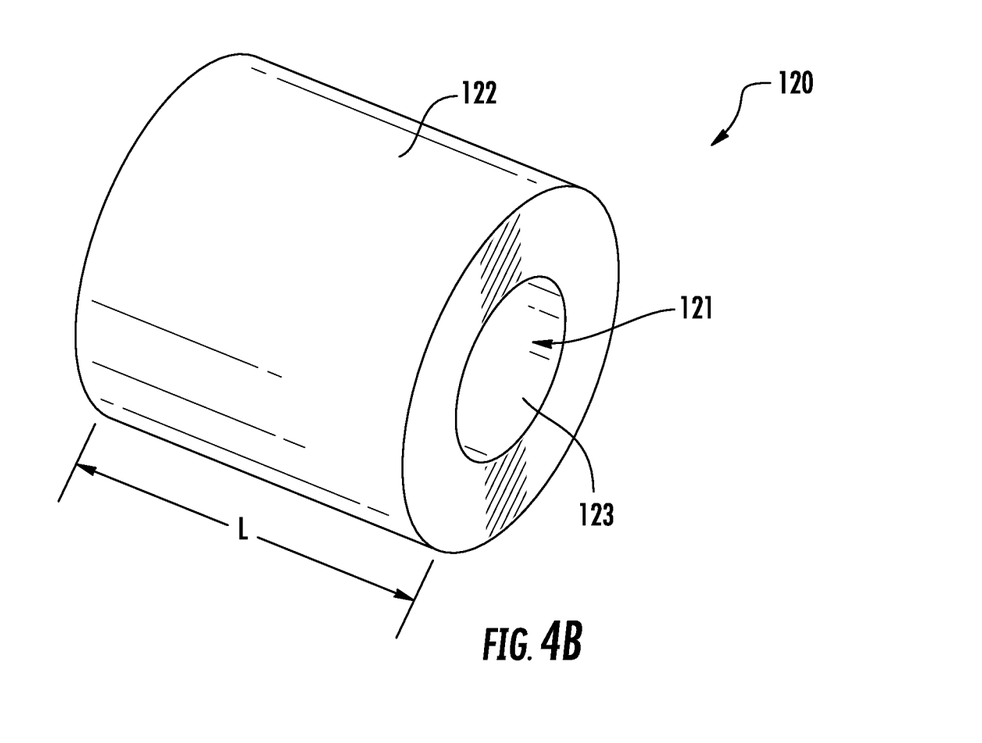
FIG. 4B is a perspective view of the example sealing grommet depicted in FIG. 4.

More specifically, the sealing grommet 120 is a low hardness sealing membrane that prevents water from entering the optical connector 101 between the connector housing 110 and the optical cable 150. The sealing grommet 120 is sized and shaped to be disposed around the optical cable 150 and within the internal cavity 116 of the connector housing 110. FIG. 4A is a front elevation view and FIG. 4B is a side perspective view of the example sealing grommet 120 shown in FIGS. 1-3. The sealing grommet 120 includes a grommet opening 121 operable to receive the optical cable 150, and an outer surface 122 operable to contact an interior surface 160 of the connector housing 110. Although the example sealing grommet 120 shown in FIGS. 1-4B is cylindrical in shape, embodiments are not limited thereto. For example, the sealing grommet 120 may be conical in shape, elliptical in shape, rectangular in shape, or another shape depending on the shape of the optical cable 150 and the connector housing 110.

The grommet opening 121 has an inner diameter $D_{GI}$ that is smaller than an optical cable diameter $D_{OC}$ of the optical cable 150 (see FIG. 1). Thus, the sealing grommet 120 is stretched over the outer jacket 153 when disposed over the optical cable 150. When disposed over the optical cable 150, a friction is present between the outer surface of the outer jacket 153 and an interior sealing surface 123 of the sealing grommet 120. Additionally, the sealing grommet 120 has an outer diameter $D_{GO}$ that is larger than a cavity diameter $D_C$ of the internal cavity 116 of the connector housing 110 (see FIG. 1). Friction is also present between the outer surface 122 of the sealing grommet 120 and the interior surface 160 of the connector housing 110. As described in more detail below, the sealing grommet 120 is compressed between the optical cable 150 and the interior surface 160 of the connector housing 110 to provide IP68 rated sealing.

As stated above, the sealing grommet 120, the optical cable 150 and/or the internal cavity 116 of the connector housing 110 may have cross-sectional profile that is not circular (e.g., conical, elliptical, rectangular or another shape). Regardless of the shape of these components, the sealing grommet 120 is configured to stretch over the outer surface of the optical cable 150. Particularly, optical cable 150 has a cross-sectional area in a plane that is perpendicular to the axial direction of the optical cable assembly 100. The sealing grommet 120 has a grommet opening 121 that is smaller than the cross-sectional area of optical cable 150 such that the sealing grommet 120 stretches or otherwise expands when disposed over the optical cable 150. Additionally, the sealing grommet 120 has an outer profile such that the sealing grommet 120 is compressed between the optical cable 150 and the interior surface 160 of the connector housing 110 when the sealing grommet 120 is installed in the optical cable assembly 100. Particularly, the internal cavity 116 has a cross-sectional profile in the plane that is perpendicular to the axial direction of the optical cable assembly 100. The sealing grommet 120 has an outer profile that is greater than the cross-sectional profile of the internal cavity. Thus, the sealing grommet 120 is compressed between the outer surface of the optical cable 150 and the interior surface 160 of the connector housing 110.

The dimensions of the sealing grommet 120 are not limited by this disclosure, and will depend on the particular optical cable and optical connector to be sealed. The thickness of the sealing grommet may depend on the distance between the outer surface of the outer jacket 153 and the interior surface 160 of the connector housing 110. As a non-limiting example for the optical cable assembly 100 depicted in FIGS. 1-3, the thickness T of the sealing grommet 120 as measured in a radial direction between the interior sealing surface 123 and outer surface 122 (see FIG. 4A) is within a range of 2 mm to 4 mm. However, embodiments are not limited thereto. In one non-limiting example, the outer diameter $D_{GO}$ is 9.8 mm±0.2 mm and the inner diameter $D_{GI}$ is 4.0 mm±0.2 mm. In another non-limiting example, the outer diameter $D_{GO}$ is 9.8 mm±0.2 mm and the inner diameter $D_{GI}$ is 2.5 mm±0.2 mm.

The length L of the sealing grommet 120 as measured in an axial direction (see FIG. 4B) is also not limited by the present disclosure. The length L should be large enough so that the friction referred to above prevents water from leaking into the connector housing 110, but also not so large that the sealing grommet 120 prevents movement of the connector body 140 and the connector housing 110 as described in more detail below.

The material chosen for the sealing grommet 120 should have low hardness, such as between 15 Shore A and 25 Shore A measured according to ASTM D2240, which is incorporated herein by reference. The low hardness of the sealing grommet 120 allows it to be compressed between the optical cable 150 and the interior surface 160 of the connector housing 110. The hardness of the sealing grommet 120 should be such that the connector body 140 and the optical cable 150 are free to move within the connector housing 110, while also enabling the sealing grommet 120 to be passed over the connector body 140 during fabrication of the optical cable assembly 100.

Additionally, the material chosen for the sealing grommet 120 should have a tear resistance such it does not rip or tear when it is passed over the connector body 140 during installation. In some embodiments, the material of the sealing grommet has a tear resistance of 25 N/mm or more according to ASTM D 624 B, which is incorporated herein by reference. In some embodiments, the material of the sealing grommet 120 has a tensile strength of 8 N/mm² or more according to DIN S3 504-S1, which is incorporated herein by reference. With these mechanical properties, the sealing grommet 120 may not rip or tear when passed over the connector body 140.

Further, the material chosen for the sealing grommet 120 should have a coefficient of friction between the interior sealing surface 123 of the sealing grommet 120 and the outer surface of the outer jacket 153, and between the outer surface 122 of the sealing grommet 120 and the interior surface 160 of the connector housing 110, such that the sealing grommet 120 does not slip or minimally slips when the connector body 140 and optical cable 150 are moved within the connector housing 110, as described in more detail below. It should be understood that the coefficient of friction between the sealing grommet 120 and the outer jacket 153 and interior surface 160 will also depend on the materials of the outer jacket 153 and the connector housing 110.

In one non-limiting example, the sealing grommet is made of a liquid silicone rubber (LSR) or other silicone formulations suitable for compression molding or injection molding. Non-limiting LSR materials include ELASTOSIL® RT 620, ELASTOSIL® RT 625 and ELASTOSIL® LR 3003/20 TR manufactured by Wacker Chemie AG.

As stated above, the optical cable assembly 100 is assembled by first positioning the optical cable 150 through the bend control member cavity 134 of the bend control member 130. The sealing grommet 120 may then be disposed onto the optical cable 150. In some cases, it may be desired to convert an existing optical connector assembly into an optical connector having a sealing grommet 120 and IP68 rated sealing described herein. In such cases, the sealing grommet 120 may be passed over the connector body 140 and placed at a location on the optical cable 150 where it may be received in the cavity of the connector housing 110.

In factory installation, the sealing grommet 120 may be disposed on the optical cable 150 prior to the end 151 of the optical cable 150 being terminated with the connector body 140. After the sealing grommet 120 is positioned on the optical cable 150, the connector body 140 is rigidly mounted on the end 151 of the optical cable 150, such as by use of a crimp member 152 as described above. Next, as shown in FIG. 3, the connector housing 110 is positioned over the connector body 140 such that the connector body 140 enters the internal cavity 116 of the connector housing 110, and is eventually disposed within a connector body cavity portion 161 of the internal cavity 116. The engagement features 142 (FIGS. 1 and 2) on the side walls of the connector body 140 cooperate with the engagement features 118 of the connector housing 110 to retain the connector housing 110 on the connector body 140.

The sealing grommet 120 is then positioned within the internal cavity 116 of the connector housing 110 via the second housing end portion 114 such that it is compressed between the optical cable 150 and the interior surface 160 of the connector housing 110. After the sealing grommet 120 is installed in the connector housing 110, the bend control member 130 is pushed toward the connector housing 110 such that the second housing end portion 114 becomes partially disposed within the bend control member cavity 134. Next, the bend control member 130 is rotated to provide threaded engagement between the exterior threaded surface 115 of the second housing end portion 114 and the internal threaded surface 136 within the bend control member cavity 134. The bend control member 130 is rotated with respect to the connector housing 110 until the mating surface 132 of the bend control member 130 is pressed against the mating surface 165 of the connector housing 110.

Figure 5:
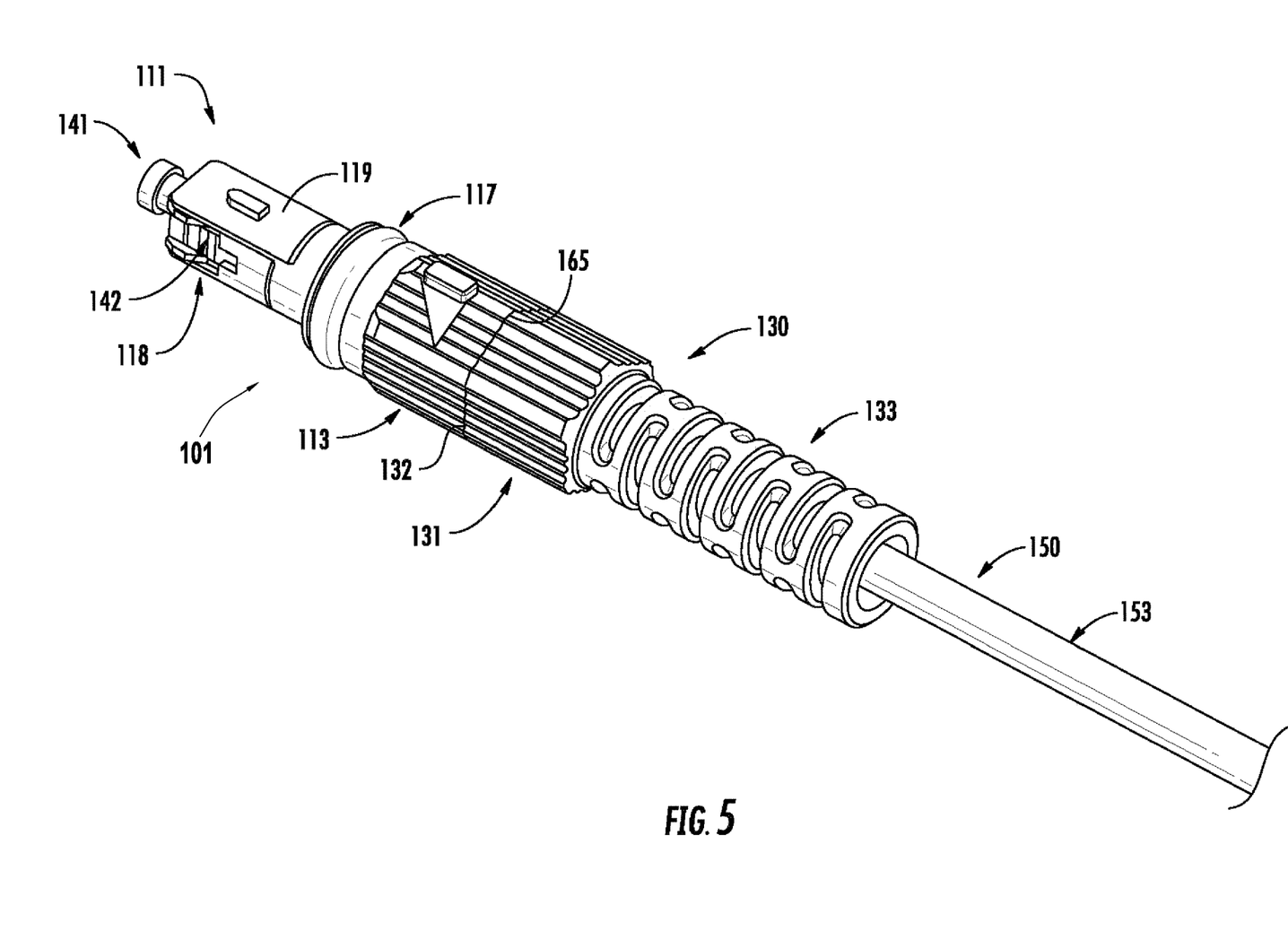
FIG. 5 is a perspective view of the example ruggedized optical connector depicted in FIGS. 1-3 in an assembled stated.
Figure 6:
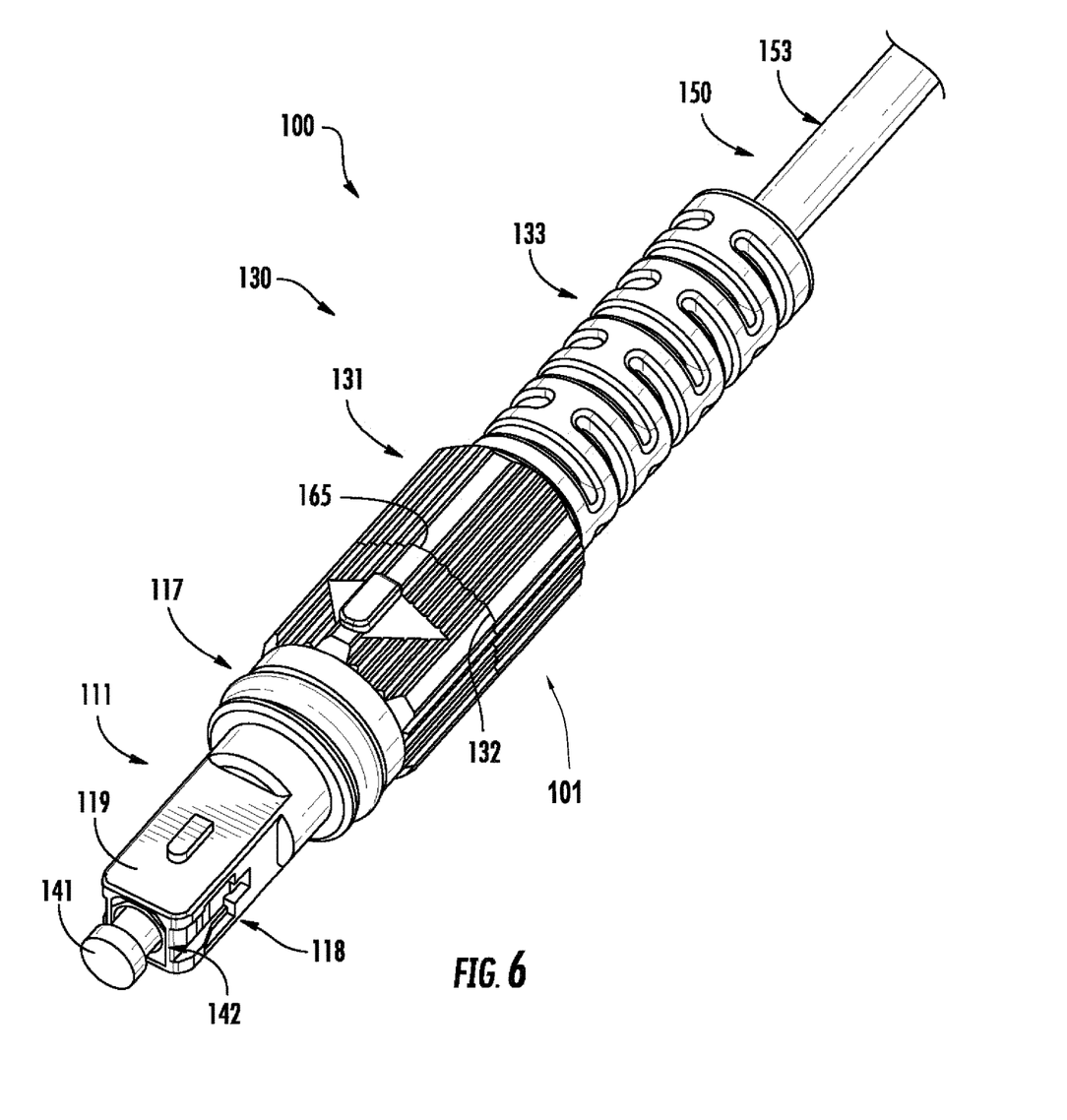
FIG. 6 is another perspective view of the example ruggedized optical connector depicted in FIGS. 1-3 and 5 in an assembled state.
Figure 7:
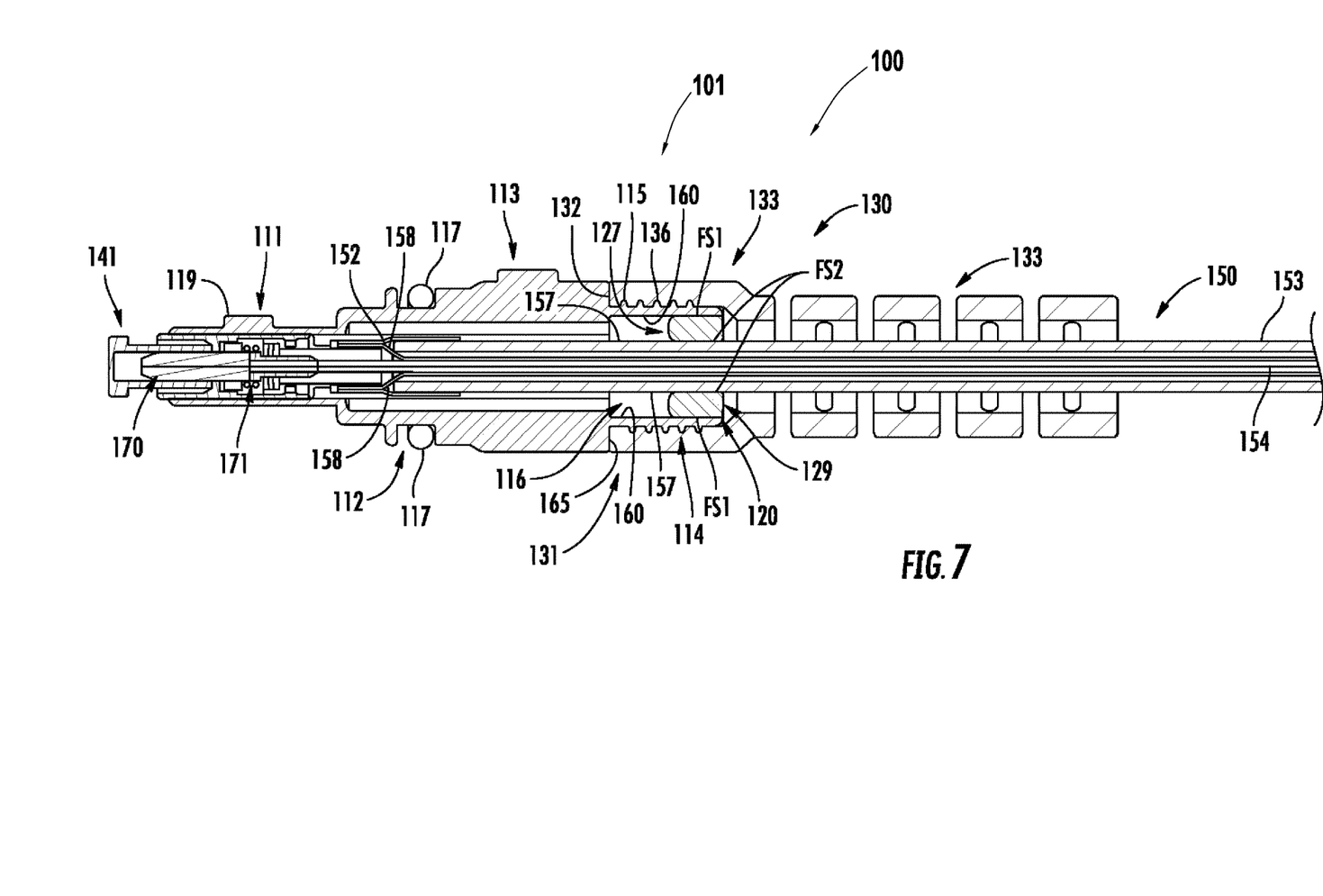
FIG. 7 is a cross-sectional view of the example ruggedized optical connector depicted in FIGS. 1-3, 5 and 6 in an assembled state.

FIGS. 5 and 6 schematically depict perspective views of a fully assembled factory mounted optical connector 101. FIG. 7 is a cross-sectional view of the assembled optical connector 101 shown in FIGS. 5 and 6. As shown in FIG. 7, the sealing grommet 120 is disposed within the internal cavity 116 and the second housing end portion 114 of the connector housing 110. The sealing grommet 120 is compressed between the outer jacket 153 of the optical cable 150 and the interior surface 160 of the connector housing 110 such that a first end 127 and a second end 129 of the sealing grommet 120 each have a convex shape. The first end 127 of the sealing grommet 120 is closer to the connector body 140 than the second end 129.

There is a first friction surface interface FS1 between the sealing grommet 120 and the interior surface 160 of the connector housing 110, and a second friction surface interface FS2 between the sealing grommet 120 and the outer jacket 153 of the optical cable 150. These friction surface interfaces provide the IP68 rated sealing described herein.

The low hardness and thickness of the sealing grommet 120 allow the sealing grommet 120 to deform when the optical cable 150 is pulled or pushed to axially move the connector body 140 relative to the connector housing 110. The friction between the sealing grommet 120 and the outer jacket 153 and the connector housing 110 is such that the sealing grommet has minimal slipping at the first friction surface interface FS1 and the second friction surface interface FS2. It is desirable to have no slipping of the sealing grommet 120 at the first friction surface FS1 and the second friction surface FS1. However, the sealing grommet 120 may slip inside the internal cavity 116 and still prevent water from entering the internal cavity 116.

Figure 8A:
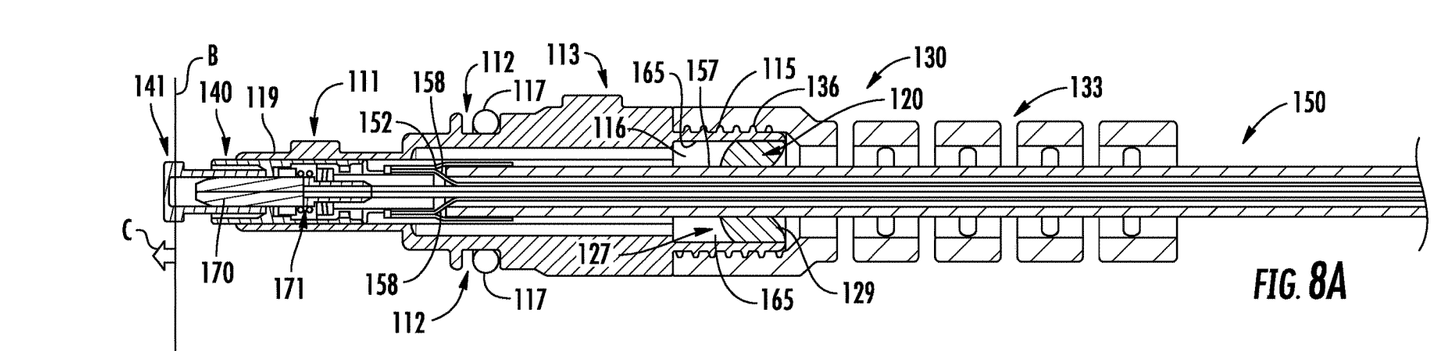
FIG. 8A is a cross-sectional view of the example ruggedized depicted in FIGS. 1-3 and 5-7 with an optical cable and a connector body moved relative to an external connector housing such that the connector body extends out of the external connector housing.
Figure 8B:
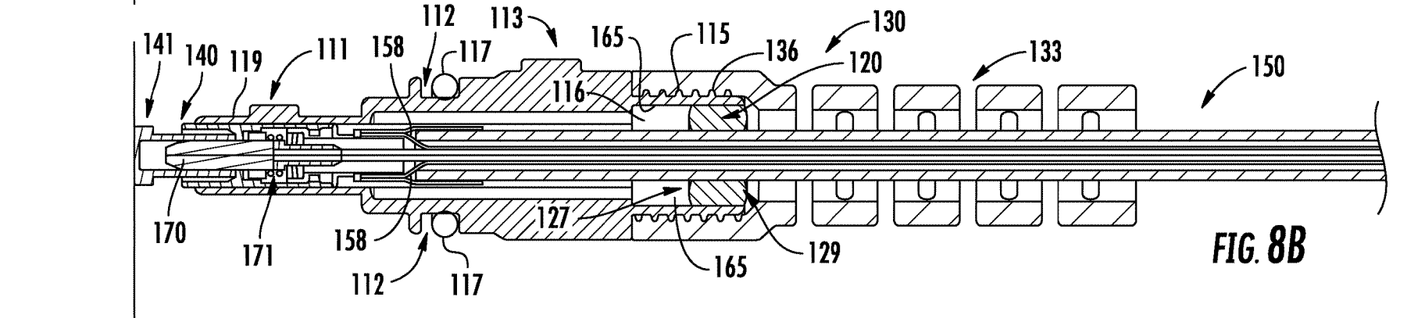
FIG. 8B is a cross-sectional view similar to FIG. 8A, but with the optical cable and the connector body in a neutral position with respect to the external connector housing.
Figure 8C:
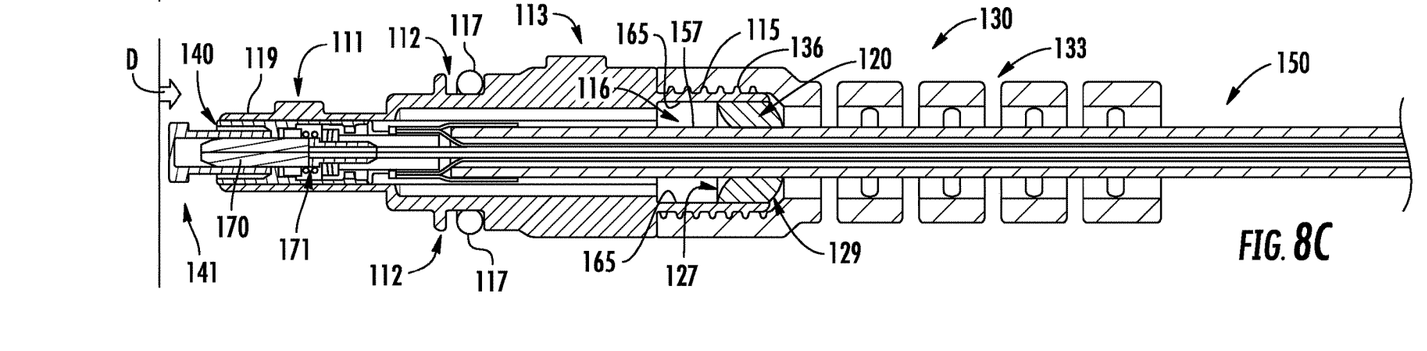
FIG. 8C is a cross-sectional view similar to 8A, but with the optical cable and the connector body axially moved such that the connector body is pulled inwardly into the external connector housing according.

FIGS. 8A-8C illustrate the connector body 140 at different positions within the connector housing 110. Reference line B is shown to illustrate the relative position of the connector body 140 between the three figures. Referring first to FIG. 8A, the optical cable 150 is pushed in the axial direction toward the connector housing 110 in a direction indicated by arrow C. The force on the optical cable 150 pushes the connector body 140 out of the connector housing 110. The tip of the dust cap 141 extends beyond reference line B. This movement of the connector body 140 and the optical cable 150 relative to the connector housing 110 causes the sealing grommet 120 to deform without slipping. The sealing grommet 120 is deformed such that the first end 127 of the sealing grommet 120 has a convex shape and the second end 129 of the sealing grommet 120 has a concave shape.

FIG. 8B shows the optical connector 101 with the connector body 140 in a neutral position with respect to the connector housing 110 (i.e., no force applied to the optical cable 150). FIG. 8B is similar to FIG. 7 wherein both the first end 127 and the second end 129 of the sealing grommet have a convex shape. In this position, the tip of the dust cap 141 is at the reference line B.

In FIG. 8C, the optical cable 150 is pulled in an axial direction away from the connector housing 110 in a direction as indicated by arrow D. The force on the optical cable 150 pulls the connector body 140 further into the connector housing 110. The tip of the dust cap 141 is retracted so that no portion of the dust cap 141 extends beyond the reference line B. This movement of the connector body 140 and the optical cable 150 relative to the connector housing 110 causes the sealing grommet 120 to deform with no or minimal slipping. The sealing grommet 120 is deformed such that the first end 127 of the sealing grommet 120 has a concave shape and the second end 129 of the sealing grommet 120 has a convex shape.

The sealing grommets described herein may also be utilized in field mountable optical connectors wherein the connector body is rigidly mounted to an end of an optical cable in the field rather than at the factory. FIG. 9 schematically depicts an example optical cable assembly 200 comprising a ruggedized field mountable optical connector 201. The example optical cable assembly 200 generally comprises an optical cable 150 and the optical connector 201 further comprising a field mountable connector assembly 245, a connector housing 210, a housing extension 260, and a bend control member 130. The optical cable 150 and the bend control member 130 are similar to those described above with respect to FIGS. 1-3.

The field mountable optical cable assembly 200 can be completely configured in the field, which provides added flexibility. The field mountable optical cable assembly 200 can also be repaired in the field, as well as re-configured into another connector style, if needed. In this manner, drop cables including ruggedized optical connectors may be easily configured and/or repaired in the field.

The connector housing 210 has a similar configuration as the connector housing 110 depicted in FIGS. 1-3 and described above. Although the connector housing 210 is configured as part of an SC-type connector, like connector housing 110, the connector housing 210 may have a configuration according to other connector types. And like connector housing 110, the connector housing 210 has a first housing end portion 111 with a shell portion 119, a middle portion 113, a second housing end portion 114, an exterior threaded surface 115 on the second housing end portion 114, and an internal cavity 116 running through the connector housing 210. The example connector housing 210 further includes an additional sealing element 219 (e.g., an o-ring) disposed between the middle portion 113 and the exterior threaded surface 115. The additional sealing element 219 acts as an inter-housing sealing member that provides an environmental seal between the connector housing 210 and the housing extension 260 when the housing extension 260 is attached to the second housing end portion 114 of the connector housing 210.

The field mountable connector assembly 245 includes a connector body 240 having a clamping portion 252 and a boot 270. The connector body 240 may be similarly configured as the connector body 140 shown in FIGS. 1-3 and described above. When assembled, the connector body 240 is disposed within the shell portion 119 of the connector housing 210 such that engagement features 242 of the connector body 240 cooperate with the engagement features 118 of the connector housing 210. The connector body 240 is configured to retain a ferrule similar to the manner in which the connector body 140 (FIGS. 1-3) retains the ferrule 170. The ferrule cannot be seen in FIG. 9, but a dust cap 141 that placed over the ferrule can be seen.

The field mountable connector assembly 245 further includes a fiber stub secured in the ferrule (not shown) by an epoxy or other suitable adhesive, and a mechanical splice device. The fiber stub extends through the ferrule, such that a first fiber stub end slightly protrudes from or is coincident or coplanar with the end face of the ferrule. The first fiber stub end may be factory polished (e.g., a flat or angle-polish, with or without bevels). A second end of the fiber stub extends rearwardly from the ferrule and part-way into the interior of the field mountable connector assembly 245, where the fiber stub is mechanically spliced or otherwise secured to a terminal end of the optical fiber 154 of the optical cable 150. The splice between the fiber stub and the optical fiber 154 may be maintained within the connector body 240. The second end of the fiber stub can be cleaved (flat or angled, with or without bevels) in the factory or the field prior to establishing the splice with the optical fiber 154. The fiber stub and the optical fiber 154 are optically coupled to one another such that optical signals pass between the fiber stub and the optical fiber 154.

In the illustrated embodiment, the example field mountable connector assembly 245 further includes a clamping portion 252 that is configured to clamp on to the outer jacket 153 of the optical cable. A boot 270 may be screwed onto the clamping portion 252 to cause the clamping portion to compress and clamp the outer jacket 153.

It should be understood that the field mountable connector assembly 245 depicted by FIG. 9 is for illustrative purposes only, and that other configurations are also possible. For example, embodiments are possible involving fusion splices rather than mechanical splices.

In some cases, the field mountable connector assembly 245 may be too long to fit within the connector housing 210 (i.e., the field mountable connector assembly 245 is longer than the connector housing 210). In such cases, an optional housing extension 260 may be utilized as shown in FIG. 9. Because field mountable connector assemblies 245 may have different configurations, not all field mountable optical connectors may require a housing extension 260. The example housing extension 260 has a first extension end 261, a second extension end 264, and an extension cavity 262. The second extension end 264 has an outer threaded surface 263 operable to mate with the internal threaded surface 136 of the bend control member 130 (similar to as shown in FIG. 3). The first extension end 261 has an internal threaded surface (not shown) within the extension cavity 262 that is operable to mate with the exterior threaded surface 115 on the second housing end portion 114 of the connector housing 110. When assembled, a rear portion of the field mountable connector assembly 245 may be disposed within the housing extension 260. The additional sealing element 219 provides environmental sealing between the housing extension 260 and the connector housing 210.

The example field mountable optical cable assembly 200 comprises a sealing grommet 120 that is positioned on the optical cable 150 between the bend control member 130 and the housing extension 260. The sealing grommet 120 may be configured as described above with respect to FIGS. 1-8C. As described above, the sealing grommet 120 is disposed within the extension cavity 262 of the housing extension 260. The sealing grommet 120 is compressed between the interior surface of the second extension end 264 and the outer jacket 153. The bend control member 130 is coupled to the housing extension 260 by mating the interior threaded surface of the bend control member 130 (not shown) with the outer threaded surface 263.

The field mountable optical cable assembly 200 may be assembled by positioning the optical cable 150 through the bend control member 130. Next, the sealing grommet 120 is positioned on the optical cable 150 as described above with respect to the optical connector 101. The optical cable 150 is then disposed in the extension cavity 262 of the housing extension 260.

The field mountable connector assembly 245 is installed on the end of the optical cable 150 by any method (e.g., splicing the optical fiber of the optical cable to the fiber stub of the field mountable connector assembly 245 and clamping the clamping portion 252 of the connector body 240 to the outer jacket 153 of the optical cable 150 using the boot 270). Next, the connector body 240 is then positioned in the shell portion 119 of the connector housing 210. The housing extension 260 is mounted to the connector housing 210 using the threaded surfaces as describe above.

The sealing grommet 120 is then pushed into the extension cavity 262 such that it is compressed between the optical cable 150 and the housing extension 260. Finally, the bend control member 130 is mounted to the housing extension 260 using the threaded surfaces as described above.

It should now be understood that embodiments of the present disclosure provide IP68 rated sealing for ruggedized optical connectors of optical cable assemblies that are either factory mounted or field mounted. Embodiments utilize a sealing grommet having low hardness and sufficient tear resistance and sufficient tensile strength to allow the grommet to be passed over a connector body without tearing. Exemplary ranges for such properties in this disclosure are intended to include endpoints of the ranges (e.g., language such as "within a range of" and "between" is not intended to exclude end points of the associated range). The sealing grommets described herein may be utilized for round, oval or flat drop cables. Embodiments eliminate the need for complex tools and components to provide IP68 rated sealing.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An optical cable assembly comprising:
an optical cable having an end;
a connector body coupled to the end of the optical cable;
a sealing grommet disposed over the optical cable such that an internal sealing surface of the sealing grommet is in contact with an outer surface of the optical cable, wherein the sealing grommet comprises a first end and a second end; and
a connector housing comprising a first housing end portion, a second housing end portion, and an internal cavity, the internal cavity being at least partially defined by an interior surface of the second housing end portion, wherein:
the connector body is at least partially disposed within the internal cavity of the connector housing;
the sealing grommet is positioned within the internal cavity such that an outer surface of the sealing grommet is in contact with the interior surface of the second housing end portion;
the connector body and the optical cable are movable relative to the connector housing in an axial direction of the optical cable assembly; and
the sealing grommet is deformable to accommodate movement of the connector body and the optical cable relative to the connector housing, and the sealing grommet is deformable in a manner such that the first end has a convex shape and the second end has a concave shape when the optical cable moves along the axial direction toward the first housing end portion of the connector housing, and the sealing grommet is deformable in a manner such that the first end has a concave shape and the second end has a convex shape when the optical cable moves along the axial direction away from the first housing end portion of the connector housing.

2. The optical cable assembly of claim 1, wherein:
the internal cavity has a cross-sectional profile in a plane that is perpendicular to the axial direction and within the second housing end portion;
the optical cable has a cable diameter and cross-sectional area based on the cable diameter;
the sealing grommet comprises a grommet opening smaller than the cross-sectional area of the optical cable when the sealing grommet is in an undeformed state; and
the sealing grommet comprises an outer profile that is greater than the cross-sectional profile of the internal cavity.

3. The optical cable assembly of claim 1, wherein the sealing grommet is cylindrical in shape.

4. The optical cable assembly of claim 1, wherein the sealing grommet is conical in shape.

5. The optical cable assembly of claim 1, wherein the connector body comprises an external groove, and the optical cable assembly further comprises a sealing element disposed within the external groove.

6. The optical cable assembly of claim 1, further comprising a bend control member comprising:
a main portion;
a bend control portion extending from the main portion;
a bend control member cavity through the main portion and the bend control portion; and a threaded surface on an interior surface of the bend control member cavity, wherein:
the threaded surface is located within the main portion of the bend control member;
the connector housing comprises a threaded surface on the second housing end portion; and
the connector housing is coupled to the bend control member by engagement between the threaded surface of the second housing end portion and the threaded surface of the bend control member.

7. The optical cable assembly of claim 1, wherein:
the optical cable further comprises an optical fiber;
the optical cable assembly further comprises a ferrule within the connector body and a fiber stub disposed within the ferrule; and
an end of the optical fiber is secured and optically coupled to an end of the fiber stub.

8. The optical cable assembly of claim 1, wherein the optical cable further comprises an optical fiber, and wherein the optical cable assembly further comprises a ferrule to which the optical fiber is secured and a bias member that biases the ferrule within the connector body.

9. An optical cable assembly comprising:
an optical cable having an end;
a connector body coupled to the end of the optical cable, wherein the connector body is field mountable;
a connector housing comprising a first housing end portion, a second housing end portion, and an internal cavity, wherein:
the connector body is at least partially disposed within the internal cavity of the connector housing; and
the second housing end portion comprises a threaded surface;
a housing extension comprising a first extension end, a second extension end, and an extension cavity, the extension cavity being at least partially defined by an interior surface of the second extension end, wherein:
the first extension end comprises an internal threaded surface within the extension cavity; and
the second extension end comprises an outer threaded surface; and
a sealing grommet disposed over the optical cable such that an internal sealing surface of the sealing grommet is in contact with an outer surface of the optical cable, and the sealing grommet comprises a first end and a second end, wherein:
the threaded surface of the second housing end portion is mated with the internal threaded surface at the first extension end of the housing extension;
the sealing grommet is positioned within the extension cavity such that an outer surface of the sealing grommet is in contact with the interior surface of the housing extension; and
the connector body and the optical cable are movable relative to the connector housing and the housing extension in an axial direction of the optical cable assembly, and the sealing grommet is deformable to accommodate movement of the connector body and the optical cable relative to the connector housing and the housing extension, wherein the sealing grommet is deformable in a manner such that the first end has a convex shape and the second end has a concave shape when the optical cable moves along the axial direction toward the first housing end portion of the connector housing, and the sealing grommet is deformable in a manner such that the first end has a concave shape and the second end has a convex shape when the optical cable moves along the axial direction away from the first housing end portion of the connector housing.

10. The optical cable assembly of claim 9, wherein:
the extension cavity of the housing extension has a cross-sectional profile in a plane that is perpendicular to the axial direction and within the second housing end portion;
the optical cable has a cable diameter and cross-sectional area based on the cable diameter;
the sealing grommet comprises a grommet opening smaller than the cross-sectional area of the optical cable when the sealing grommet is in an undeformed state; and
the sealing grommet comprises an outer profile that is greater than the cross-sectional profile of the extension cavity of the housing extension.

11. The optical cable assembly of claim 9, wherein the connector body comprises an external groove, and the optical cable assembly further comprises a sealing element disposed within the external groove.

12. The optical cable assembly of claim 9, further comprising a bend control member comprising:
a main portion;
a bend control portion extending from the main portion;
a bend control member cavity through the main portion and the bend control portion; and
a threaded surface on an interior surface of the bend control member cavity, wherein the threaded surface is located within the main portion of the bend control member,
wherein the housing extension is coupled to the bend control member by engagement between the outer threaded surface of the housing extension and the threaded surface of the bend control member.

13. The optical cable assembly of claim 9, wherein the optical cable further comprises an optical fiber, and the optical cable assembly further comprises a ferrule to which the optical fiber is secured and a bias member that biases the ferrule within the connector body.

14. A method of assembling an optical cable assembly, the method comprising:
translating a sealing grommet over a connector body coupled to an end of an optical cable such that an internal sealing surface of the sealing grommet is in contact with an outer surface of the optical cable, wherein the sealing grommet comprises a first end and a second end;
positioning a connector housing over the connector body, the connector housing comprising a first housing end portion, a second housing end portion, and an internal cavity, the internal cavity being at least partially defined by an interior surface of the second housing end portion, wherein the connector body is at least partially disposed within the internal cavity of the connector housing; and
positioning the sealing grommet within the internal cavity such that an outer surface of the sealing grommet is in contact with the interior surface of the second housing end portion, wherein the connector body and the optical cable are movable relative to the connector housing in an axial direction of the optical cable assembly, and the sealing grommet is deformable to accommodate movement of the connector body and the optical cable relative to the connector housing, wherein the sealing grommet is deformable in a manner such that the first end has a convex shape and the second end has a concave shape when the optical cable moves along the axial direction toward the first housing end portion of the connector housing, and the sealing grommet is deformable in a manner such that the first end has a concave shape and the second end has a convex shape when the optical cable moves along the axial direction away from the first housing end portion of the connector housing.

15. The method of claim 14, wherein:
the internal cavity has a cross-sectional profile in a plane that is perpendicular to the axial direction and within the second housing end portion;
the optical cable has a cable diameter and cross-sectional area based on the cable diameter;
the sealing grommet comprises a grommet opening smaller than the cross-sectional area of the optical cable when the sealing grommet is in an undeformed state; and
the sealing grommet comprises an outer profile that is greater than the cross-sectional profile of the internal cavity.

16. The method of claim 14, wherein the sealing grommet is cylindrical in shape.

17. The method of claim 14, wherein the sealing grommet is conical in shape.

18. The method of claim 14, wherein the connector body comprises an external groove, and the optical cable assembly further comprises a sealing element disposed within the external groove.

19. The method of claim 14, further comprising coupling a bend control member to the connector housing, the bend control member comprising:
a main portion;
a bend control portion extending from the main portion;
a bend control member cavity through the main portion and the bend control portion; and
a threaded surface on an interior surface of the bend control member cavity, wherein the threaded surface is located within the main portion of the bend control member; and
wherein:
the connector housing comprises a threaded surface on the second housing end portion; and
the coupling of the bend control member to the connector housing is performed by rotating the bend control member such that the threaded surface of the connector housing engages the threaded surface of the bend control member.

* * * * *